United States Patent
Koshi et al.

(10) Patent No.: US 10,581,168 B2
(45) Date of Patent: Mar. 3, 2020

(54) ANTENNA AND ELECTRIC DEVICE

(71) Applicant: Panasonic Intellectual Property Management Co., Ltd., Osaka (JP)

(72) Inventors: Masashi Koshi, Ishikawa-ken (JP); Hiroyuki Uno, Ishikawa-ken (JP); Tomoaki Nishikido, Ishikawa-ken (JP); Yuki Anbe, Ishikawa-ken (JP); Hitoshi Takai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/505,778

(22) PCT Filed: Dec. 7, 2015

(86) PCT No.: PCT/JP2015/006055
§ 371 (c)(1),
(2) Date: Feb. 22, 2017

(87) PCT Pub. No.: WO2016/092801
PCT Pub. Date: Jun. 16, 2016

(65) Prior Publication Data
US 2017/0279200 A1    Sep. 28, 2017

(30) Foreign Application Priority Data
Dec. 8, 2014    (JP) .................... 2014-248283

(51) Int. Cl.
*H01Q 9/04* (2006.01)
*H01Q 1/22* (2006.01)
(Continued)

(52) U.S. Cl.
CPC ............. *H01Q 9/0421* (2013.01); *H01Q 1/22* (2013.01); *H01Q 1/24* (2013.01); *H01Q 1/38* (2013.01);
(Continued)

(58) Field of Classification Search
CPC .......... H01Q 9/0421; H01Q 9/40; H01Q 1/38; H01Q 5/378; H01Q 1/22; H01Q 1/24;
(Continued)

(56) References Cited

U.S. PATENT DOCUMENTS 7,443,349 B2    10/2008    Harano
7,636,065 B2    12/2009    Ohishi et al.
(Continued)

FOREIGN PATENT DOCUMENTS

CN    101075701    11/2007
EP    2234200 A1    9/2010
(Continued)

OTHER PUBLICATIONS

Extended European Search Report issued in Application No. 15866536.4 dated Oct. 26, 2017.
(Continued)

*Primary Examiner* — Hai V Tran
*Assistant Examiner* — Michael M Bouizza
(74) *Attorney, Agent, or Firm* — McDermott Will & Emery LLP

(57) ABSTRACT

An antenna includes: a radiating element that is formed of a conductor and radiates electromagnetic waves when supplied with electrical power; and a parasitic element that is (i) formed of a conductor, (ii) provided near the radiating element so as to be electromagnetically coupled with the radiating element, (iii) provided in a plane substantially
(Continued)

perpendicular to a plane including the radiating element, and (iv) guides the electromagnetic waves without being supplied with electrical power.

12 Claims, 15 Drawing Sheets

(51) Int. Cl.
| | | |
|---|---|---|
| *H01Q 1/24* | (2006.01) | |
| *H01Q 1/38* | (2006.01) | |
| *H01Q 5/378* | (2015.01) | |
| *H01Q 9/40* | (2006.01) | |
| *H04M 1/02* | (2006.01) | |
| *H01Q 9/42* | (2006.01) | |
| *H01Q 21/28* | (2006.01) | |
| *H01Q 19/26* | (2006.01) | |

(52) U.S. Cl.
CPC ............... *H01Q 5/378* (2015.01); *H01Q 9/40* (2013.01); *H01Q 9/42* (2013.01); *H01Q 19/26* (2013.01); *H01Q 21/28* (2013.01); *H04M 1/02* (2013.01)

(58) Field of Classification Search
CPC .......... H01Q 21/28; H01Q 19/26; H01Q 9/42; H04M 1/02
See application file for complete search history.

(56) References Cited

U.S. PATENT DOCUMENTS

| | | | |
|---|---|---|---|
| 7,755,560 | B2 | 7/2010 | Park et al. |
| 8,219,165 | B2 | 7/2012 | Kikuchi et al. |
| 2002/0018021 | A1 | 2/2002 | Koyanagi et al. |
| 2003/0045324 | A1 | 3/2003 | Nagumo et al. |
| 2004/0032370 | A1 | 2/2004 | Ito et al. |
| 2006/0028380 | A1 | 2/2006 | Harano |
| 2007/0290928 | A1 | 12/2007 | Chang et al. |
| 2008/0136712 | A1* | 6/2008 | Suzuki ................... H01Q 1/243 343/700 MS |
| 2008/0158088 | A1 | 7/2008 | Mai et al. |
| 2008/0278384 | A1 | 11/2008 | Shimasaki et al. |
| 2008/0316120 | A1 | 12/2008 | Hirota et al. |
| 2009/0027286 | A1 | 1/2009 | Ohishi et al. |
| 2009/0046019 | A1* | 2/2009 | Sato ......................... H01Q 3/44 343/702 |
| 2009/0066603 | A1 | 3/2009 | Park et al. |
| 2011/0086667 | A1 | 4/2011 | Kikuchi et al. |
| 2014/0085157 | A1 | 3/2014 | Xu et al. |
| 2014/0327584 | A1* | 11/2014 | Chang ................... H01Q 1/243 343/702 |
| 2015/0130669 | A1 | 5/2015 | Sonoda et al. |

FOREIGN PATENT DOCUMENTS

| | | |
|---|---|---|
| EP | 2445053 A1 | 4/2012 |
| JP | 32-070104 A | 3/1990 |
| JP | 2002-043826 A | 2/2002 |
| JP | 2003-298328 A | 10/2003 |
| JP | 2008-160684 A | 7/2008 |
| JP | 2008-283464 A | 11/2008 |
| JP | 2009-004875 A | 1/2009 |
| JP | 2009-153094 A | 7/2009 |
| JP | 2012-235224 A | 11/2012 |
| JP | 2014-522595 A | 9/2014 |
| WO | 2014/013840 A1 | 1/2014 |

OTHER PUBLICATIONS

International Search Report issued in Application No. PCT/JP2015/006055 dated Feb. 23, 2016, with English translation.
Office Action and Search Report issued in Chinese Patent Application No. 201580045073.5 dated Dec. 4, 2018, with partial translation.
Office Action and Search Report issued in Chinese Patent Application No. 201580045073.5 dated Dec. 6, 2018, with partial translation.

* cited by examiner

ANTENNA AND ELECTRIC DEVICE

RELATED APPLICATIONS

This application is the U.S. National Phase under 35 U.S.C. § 371 of International Application No. PCT/JP2015/006055, filed on Dec. 7, 2015, which in turn claims the benefit of Japanese Application No, 2014-248283, filed on Dec. 8, 2014, the disclosures of which Applications are incorporated by reference herein.

TECHNICAL FIELD

The present disclosure relates to an antenna which is secured to an electric device and to the electric device including the antenna.

BACKGROUND ART

Patent Literature (PTL) 1 discloses an antenna which is installed on a portable image display device and has improved radiation directivity. This antenna includes a radiating element and a parasitic element that is provided near the radiating element at a distance of 0.25 wavelength or less, and thus can exhibit a directivity pattern with low directivity.

PTL 2 discloses a technique for improving the isolation between antennas of two wireless terminals by providing a notch in a conductive layer formed on an inner surface of a housing in which both the antennas are arranged. An electric current that flows between both the antennas through the conductive layer is reduced by the notch, and thus the isolation between both the antennas is improved.

CITATION LIST

Patent Literature

[PTL 1] Japanese Unexamined Patent Application Publication No. 2012-235224
[PTL 2] Japanese Unexamined Patent Application Publication No. 2008-283464

SUMMARY OF INVENTION

Technical Problem

The present disclosure provides an antenna which is secured to an electric device including a housing having a front surface and a back surface and is capable of reducing the occurrence of spoiling the exterior design of the electric device when viewed from the front surface thereof, and improving the directivity to the front surface side and the isolation from another antenna secured to the electric device. The present disclosure also provides the electric device including the antenna.

Solution to Problem

An antenna in the present disclosure includes: a radiating element that is formed of a conductor and radiates electromagnetic waves when supplied with electrical power; and a parasitic element that is formed of a conductor and provided near the radiating element so as to be electromagnetically coupled with the radiating element, the parasitic element being provided in a plane substantially perpendicular to a plane including the radiating element.

Advantageous Effects of Invention

An antenna in the present disclosure is secured to an electric device including a housing having a front surface and a back surface and in this case, is effective in reducing the occurrence of spoiling the exterior design of the electric device when viewed from the front surface thereof, and improving the directivity to the front surface side and the isolation from another antenna secured to the electric device.

Figure 1:
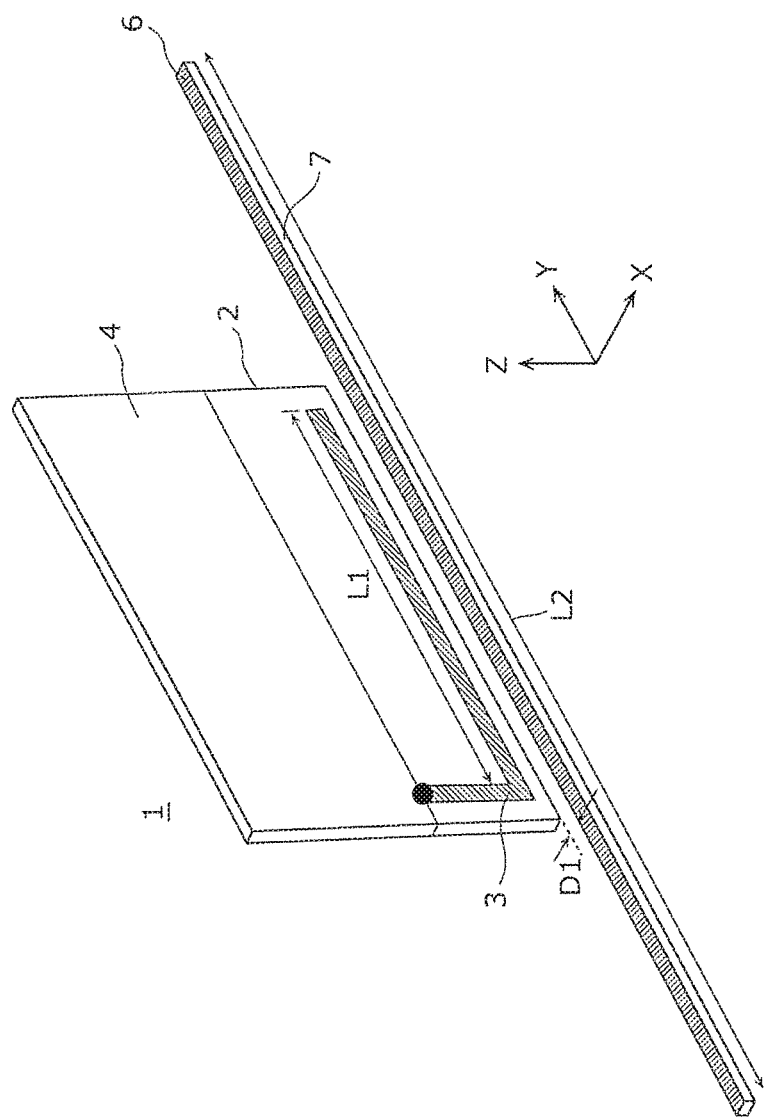
FIG. 1 is a perspective view illustrating the configuration of an antenna according to Embodiment 1.

DESCRIPTION OF EMBODIMENTS (Underlying Knowledge Forming Basis of the Present Disclosure)

First, the underlying knowledge forming the basis of the present disclosure will be described.

Recent years have seen the mounting of wireless terminals that support standards such as wireless local area network (LAN) and Bluetooth (registered trademark) even on home appliances including televisions, for example, in addition to information devices such as personal computers. Generally, when wireless terminals are mounted on televisions, these wireless terminals are often provided on the back surface (the bottom surface) of the televisions from the perspective of exterior appearance and design. The wireless terminals that support the Bluetooth (registered trademark) standard often communicate with wireless devices that are used before televisions, such as remotes and headphones, and therefore are required to radiate electromagnetic waves forward of the televisions. In the case where the wireless terminals that support the Bluetooth (registered trademark) standard are provided on the back surface of the televisions as described above, however, the propagation of electromagnetic waves radiated from antennas of the wireless terminals forward of the televisions is inhibited by the housings, etc., of the televisions. Furthermore, in the case where a wireless terminal that supports the wireless LAN standard and operates at 2.4 GHz and a wireless terminal that supports the Bluetooth (registered trademark) standard are mounted on a television and used at the same time, internal mutual interference between both the wireless terminals becomes an issue. In this regard, providing both the wireless terminals on the back surface of a television is disadvantageous because propagation of electromagnetic waves from one wireless terminal to the other wireless terminal may increase the internal mutual interference between both the wireless terminals.

Therefore, a wireless terminal is desired to ensure the forward radiation of electromagnetic waves and inhibit the internal mutual interference while reducing the occurrence of spoiling the exterior design of a television or the like.

Known techniques to adjust the directivity of an antenna of a wireless terminal include a technique such as that disclosed in PTL 1 described above. The technique disclosed in PTL 1, which aims to obtain a directivity pattern with low directivity as described above, however, does not aim to obtain an antenna having directivity in a specific direction.

Known methods of reducing the internal mutual interference include a technique such as that disclosed in PTL 2 described above. In the case where this technique is applied to an antenna secured to a metal housing of an electric device, however, the housing needs to be cut out, and thus this is hardly practical. As the path of antenna current which determines intensity of the internal mutual interference, there is a path extending through a space, aside from a path extending through a conductor serving as a ground for the antenna such as that described in PTL 2. There is, however, no known technique to reduce electromagnetic waves that propagate through a space between antennas of two wireless terminals.

Thus, the present disclosure is made on the basis of the knowledge described above and provides an antenna which is secured to an electric device including a housing having a front surface and a back surface and is capable of reducing the occurrence of spoiling the exterior design of the electric device when viewed from the front surface thereof, and improving the directivity to the front surface side and the isolation from another antenna secured to the electric device. The present disclosure also provides the electric device including the antenna.

Hereinafter, embodiments will be described in detail with reference to the drawings as necessary. However, there are instances where overly detailed description is omitted. For example, detailed description of well-known matter, redundant description of substantially identical structural elements, etc., may be omitted. This is to prevent the subsequent description from becoming unnecessarily redundant, and thus facilitate understanding by a person having ordinary skill in the art.

Note that the accompanying drawings and the subsequent description are provided by the inventor so that a person having ordinary skill in the art is able to sufficiently understand the present disclosure, and are not intended to limit the scope of the subject matter recited in the Claims.

Embodiment 1

Hereinafter, an antenna 1 according to Embodiment 1 will be described with reference to FIG. 1 to FIG. 5.

[1-1. Configuration of Antenna]

First, the configuration of the antenna 1 according to the present embodiment will be described with reference to FIG. 1 and FIG. 2.

FIG. 1 is a perspective view illustrating the configuration of the antenna 1 according to the present embodiment. As illustrated in FIG. 1, the antenna 1 includes a circuit board 2, a radiating element 3, a ground pattern 4, a parasitic element 6, and a dielectric substrate 7, and is connected to an external circuit with a connector cable (not illustrated in the drawings). The antenna 1 is used in the state of being secured to an electric device (not illustrated in the drawings) including a housing. Securing of the antenna 1 to the electric device will be described later.

The circuit board 2 is a substrate including a dielectric material and is, for example, a 1 mm-thick glass-epoxy substrate having a dielectric constant of 4.3. The radiating element 3 and the ground pattern 4 are formed on the circuit board 2.

The radiating element 3 is formed of a conductor and radiates electromagnetic waves when supplied with electrical power through the connector cable. As illustrated in FIG. 1, the radiating element 3 has an approximate L-shape. The radiating element 3 is a wiring pattern formed of, for example, metal foil such as copper foil on the circuit board 2 and has a total length L1 of approximately $0.25\lambda$. Herein, $\lambda$ represents the effective wavelength of the electromagnetic waves which the radiating element 3 radiates. The value approximately $0.25\lambda$ means a value in the range of approximately $0.2\lambda$ to $0.3\lambda$. Note that the shape of the radiating element 3 is not limited to the approximate L-shape. For example, the radiating element 3 may have a partially curved shape.

The ground pattern 4 is a wiring pattern formed of, for example, metal foil such as copper foil on the circuit board 2 and is connected to the ground.

The parasitic element 6 is formed of a conductor and provided near the radiating element 3 so as to be electromagnetically coupled with the radiating element 3. The parasitic element 6 guides the electromagnetic waves radiated from the radiating element 3, without being supplied with electrical power. In the present embodiment, the parasitic element 6 is provided in a plane substantially perpendicular to a plane including the radiating element 3. Herein, the plane including the radiating element 3 means one of the surfaces of the radiating element 3 that has the largest area. In the present embodiment, the plane including the radiating element 3 coincides with a plane in which the metal foil having an approximate L-shape is provided, that is, a plane including a main surface of the circuit board 2. Note that the ground pattern 4 is formed in the plane including the radiating element 3. The phrase "the parasitic element 6 is provided in a plane substantially perpendicular to a plane including the radiating element 3" means that one of the surfaces of the parasitic element 6 that has the largest area is provided in the plane substantially perpendicular to the plane including the radiating element 3.

The parasitic element 6 is provided near the radiating element 3 so as to be electromagnetically coupled with the radiating element 3. With this, in the parasitic element 6, an antenna current having a leading phase compared with the phase in the radiating element 3 is excited, and thus the parasitic element 6 operates as a director. In the present embodiment, the parasitic element 6 is a conductive pattern formed on the dielectric substrate 7. The parasitic element 6 is formed of, for example, metal foil such as copper foil on the dielectric substrate 7 and has a linear shape having a total length L2 of approximately 0.5λ. The value approximately 0.5λ means a value in the range of approximately 0.4λ to 0.6λ.

The dielectric substrate 7 is a substrate including a dielectric material and is, for example, a 1 mm-thick glass-epoxy substrate having a dielectric constant of 4.3, and is provided away from an end portion of the circuit board 2 at a distance D1 in the X-direction illustrated in FIG. 1 in such a way that the dielectric substrate 7 is substantially orthogonal to the circuit board 2. Herein, the distance D1 is the shortest distance between the parasitic element 6 and the radiating element 3.

For example, suppose that the operating frequency is 2.45 GHz, the total length L1 of the radiating element 3 may be 25 mm, the total length L2 of the parasitic element 6 may be 48 mm, and the distance D1 between the parasitic element 6 and the radiating element 3 may be 2.5 mm. When expressed with the effective wavelength λ, the total length L1, the total length L2, and the distance D1 are approximately 0.25λ, approximately 0.5λ, and approximately 0.02λ, respectively. Note that the total length L1 and the total length L2 appear electrically longer than actually are because of the wavelength shortening effect of the circuit board 2 and the dielectric substrate 7 formed of dielectric materials. It is sufficient that the distance D1 between the parasitic element 6 and the radiating element 3 be in the range of approximately 0.02λ to approximately 0.25λ.

In the parasitic element 6 provided as described above, an electric current is excited by the electromagnetic waves radiated from the radiating element 3. Next, the distribution of the electric current that is excited in the parasitic element 6 will be described with reference to FIG. 2.

Figure 2:
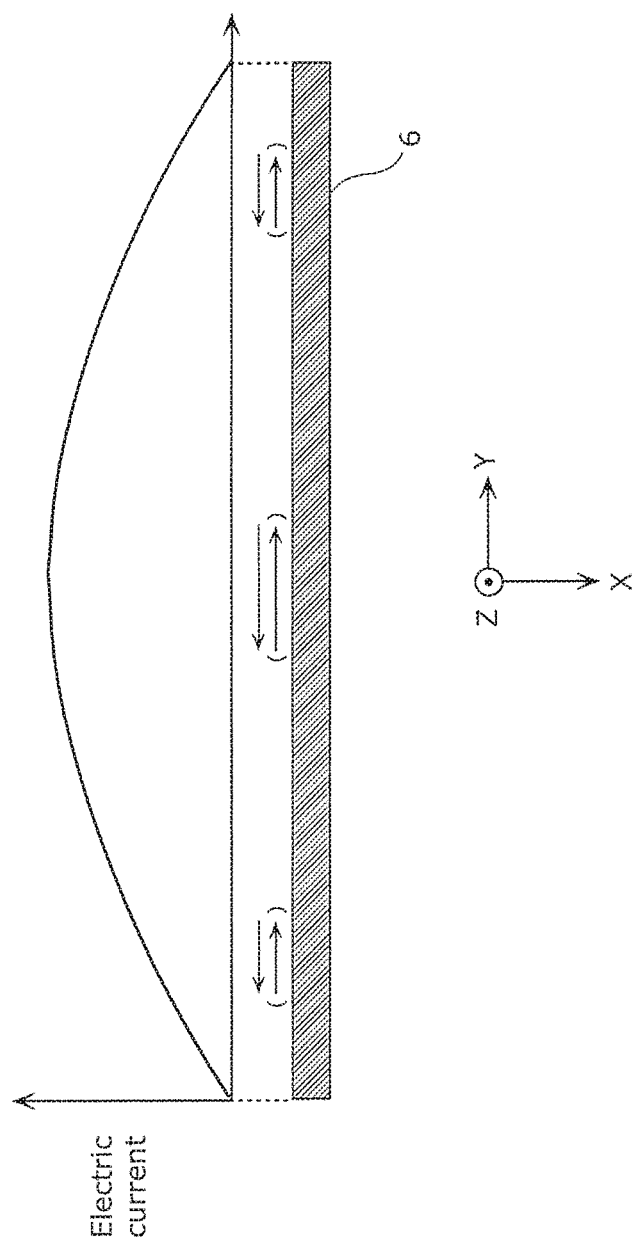
FIG. 2 schematically shows the distribution of the electric current that is excited in a parasitic element according to Embodiment 1.

FIG. 2 schematically shows the distribution of the electric current that is excited in the parasitic element 6 according to the present embodiment.

The graph in FIG. 2 shows the amplitude of an electric current that flows at positions in the longitudinal direction of the parasitic element 6. In FIG. 2, the arrows illustrated near the parasitic element 6 indicate the orientations of the electric current. Since the total length L2 of the parasitic element 6 is approximately 0.5λ, the value of the electric current is highest at an approximate center position of the parasitic element 6 and lowest at an open end (a longitudinal end portion) of the parasitic element 6. It is possible to strengthen the coupling between the radiating element 3 and the parasitic element 6 by bringing a position in the parasitic element 6 at which the amplitude of the electric current is largest, that is, a portion of the parasitic element 6 that is located approximately 0.25λ inward toward the center from the open ends thereof, close to the radiating element 3.

[1-2. Securing of Antenna to Electric Device]

Next, securing of the antenna 1 described above to the electric device will be described. In the example described below, a television is used as the electric device.

Figure 3:
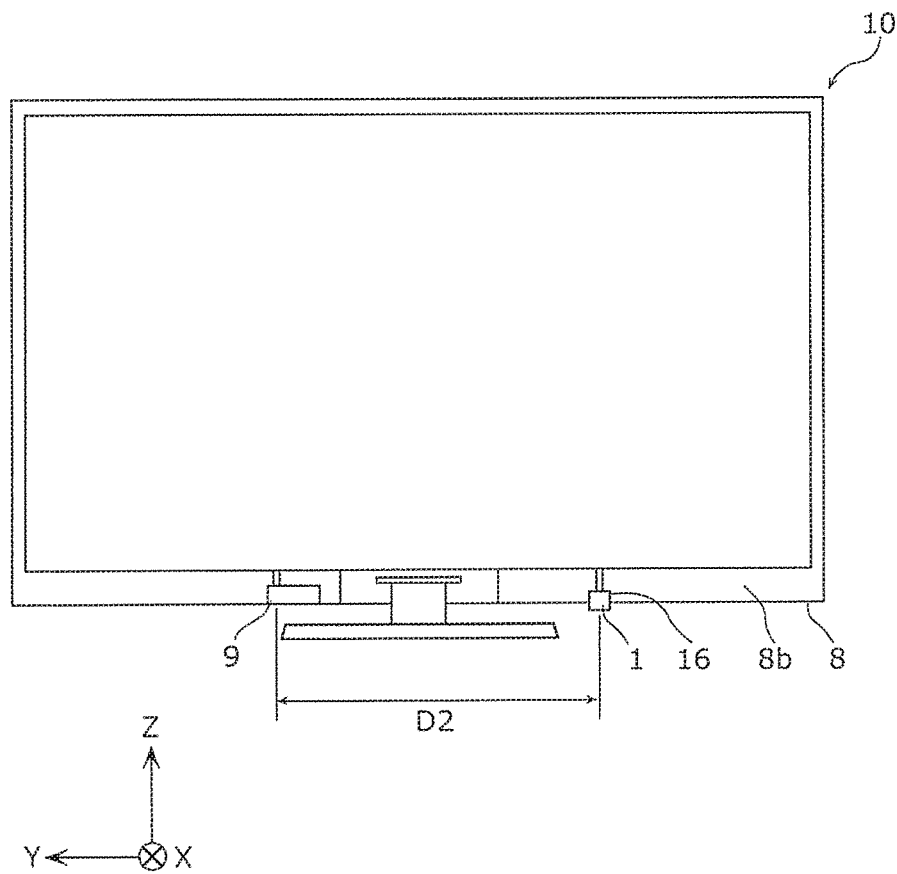
FIG. 3 is a back view illustrating a configuration in which an antenna according to Embodiment 1 is installed on the back surface of a television.

FIG. 3 is a back view illustrating a configuration in which the antenna 1 according to the present embodiment is installed on a back surface 8b (the surface on the negative side of the X-axis in FIG. 3) of a television 10.

Figure 4:
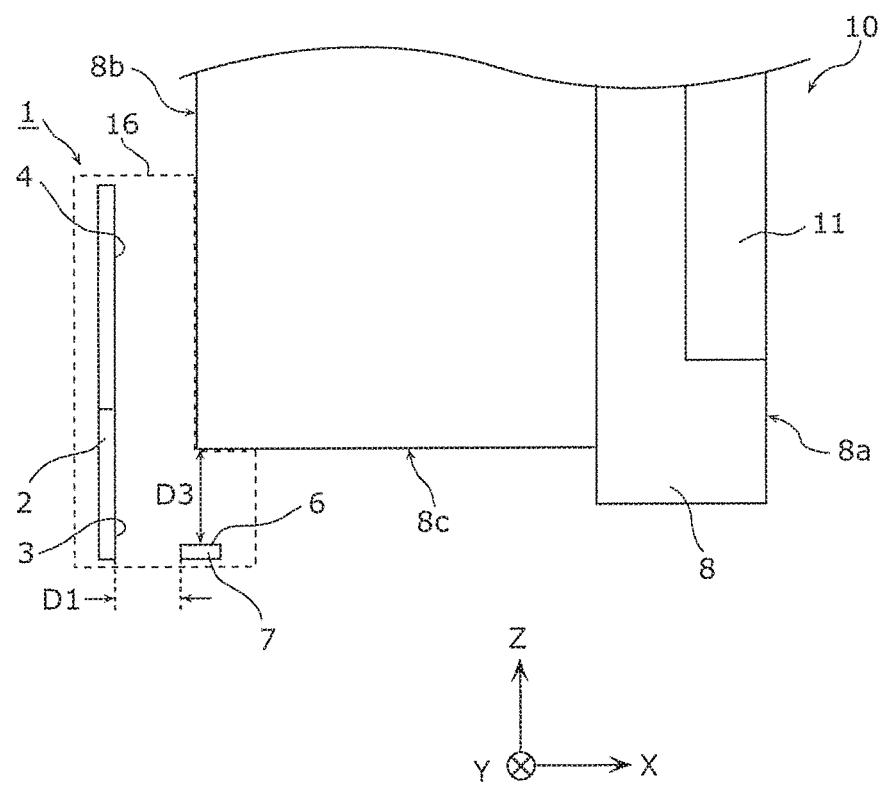
FIG. 4 is a side view illustrating a configuration in which an antenna according to Embodiment 1 is installed on the back surface of a television.

FIG. 4 is a side view illustrating the configuration in which the antenna 1 according to the present embodiment is installed on the back surface 8b (the surface on the negative side of the X-axis in FIG. 3) of the television 10.

Figure 5:
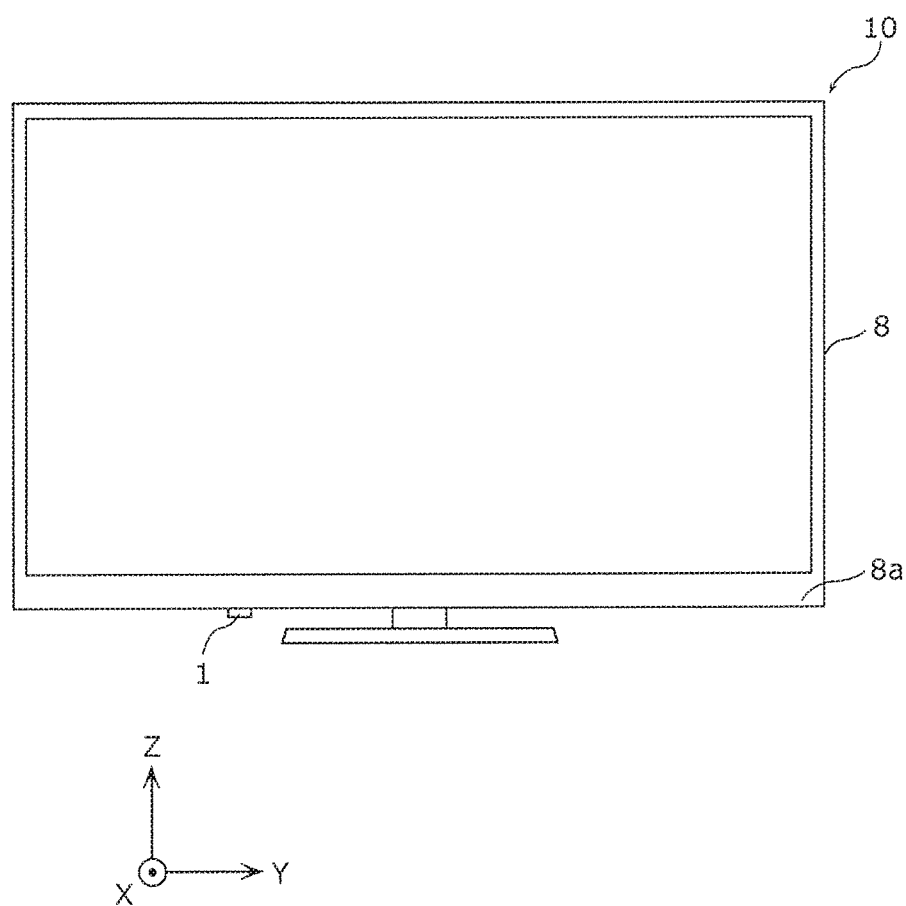
FIG. 5 is a front view illustrating a configuration in which an antenna according to Embodiment 1 is installed on the back surface of a television.

FIG. 5 is a front view illustrating the configuration in which the antenna 1 according to the present embodiment is installed on the back surface 8b (the surface on the negative side of the X-axis in FIG. 3) of the television 10.

First, the back view of the television 10 illustrated in FIG. 3 will be described.

As illustrated in FIG. 3, the television 10 includes a housing 8. In this example, the housing 8 is made of metal. The housing 8 includes the back surface 8b provided substantially parallel to the vertical direction (the Z-axis direction). The wording "substantially parallel" means that the angle between two planes or the like is approximately 20 degrees or less.

As illustrated in FIG. 3, the antenna 1 is secured to a lower portion of the back surface 8b of the housing 8. Note that when secured to the housing 8, the antenna 1 is housed in a case 16 that is formed of an insulating member such as resin and of which the cross-section taken along the Z-X plane has an approximate L-shape, for example. Furthermore, in the example illustrated in FIG. 3, an antenna 9 for use in communication that may interfere with the communication for which the antenna 1 is used is installed aside from the antenna 1. In the present embodiment, the antenna 9 includes a wireless system that operates with electromagnetic waves in the same frequency band as the antenna 1. The antenna 1 and the antenna 9 are spaced apart from each other in the longitudinal direction (the Y-axis direction in Ha 3) of the back surface 8b of the housing 8; the antenna 1 and the antenna 9 are arranged at the greatest possible distance from each other in a direction substantially orthogonal to the line segment connecting the radiating element 3 and the parasitic element 6. A distance 172 between the antenna 1 and the antenna 9 illustrated in FIG. 3 may be 450 mm, for example. Note that the antenna 1 is a device that supports the Bluetooth (registered trademark) standard, for example, and the antenna 9 is a device that supports the wireless LAN standard, for example.

Next, the side view of the television 10 illustrated in FIG. 4 will be described.

As illustrated in FIG. 4, the housing 8 of the television 10 includes the front surface 8a and the back surface 8b provided substantially parallel to the vertical direction (the Z-axis direction) and a side surface 8c (the bottom surface) substantially perpendicular to the front surface 8a and the back surface 8b. The wording "substantially perpendicular" means that the angle between two planes or the like is approximately no less than 70 degrees and no more than 110 degrees. The front surface 8a is one of the surfaces of the housing 8 which a user is expected to squarely face. The side surface 8c surrounds the front surface 8a. The side surface 8c is a vertically lower surface of the housing 8 in the present embodiment, but may be another side surface substantially perpendicular to the front surface 8a and the back surface 8b.

Furthermore, as illustrated in FIG. 4, the television 10 includes an image display device 11 such as a liquid-crystal display device or an organic electroluminescent (EL) display device on the front surface 8a side of the housing 8. The circuit board 2, the radiating element 3, the parasitic element 6, and the dielectric substrate 7 of the antenna 1 are housed in the case 16 and provided on the back surface 8b side (on the negative side of the X-axis) of the housing 8 relative to the front surface 8a. Note that in FIG. 4, only the contour of the case 16 is indicated by the dashed line for illustrating the arrangement of the elements of the antenna 1. As illustrated in FIG. 4, the case 16 in which the antenna 1 is housed is secured to the housing 8 in contact with the back surface 8b and the side surface 8c of the housing 8. In the case 16, the parasitic element 6 is provided on the front surface 8a side (in the positive direction on the X axis) of the housing 8 of the television 10, closer thereto than the radiating element 3 is. This allows the parasitic element 6 to guide the electromagnetic waves radiated from the radiating element 3, and thus the antenna 1 has directivity to the front surface 8a side of the housing 8 of the television 10. The parasitic element 6 and the side surface 8c of the housing 8 are provided substantially parallel to each other, at a distance D3 of 5 mm (approximately $0.04\lambda$) from each other. The circuit board 2 is provided substantially parallel to the back surface 8b of the housing 8.

Next, the front view of the television 10 illustrated in FIG. 5 will be described.

As illustrated in FIG. 5, a portion of the antenna 1 is provided farther outward from the housing 8 than the side surface 8c in the front view of the housing 8. Note that as illustrated in FIG. 4, the radiating element 3 and the parasitic element 6 are provided on the portion of the antenna 1 that is provided outward from the housing 8 in a front view thereof. Although the entirety of the radiating element 3 and the parasitic element 6 is provided farther outward from the side surface 8c in the front view of the housing 8 in the present embodiment, it is sufficient that at least a portion of the radiating element 3 and the parasitic element 6 be provided farther outward from the housing 8 than the side surface 8c in the front view of the housing 8.

[1-3. Advantageous Effects, Etc.]

As described above, the antenna 1 according to the present embodiment is secured to the television 10 (the electric device) including the housing 8 and includes: the radiating element 3 that is formed of a conductor and radiates electromagnetic waves when supplied with electrical power; and the parasitic element 6 formed of a conductor and provided near the radiating element 3 so as to be electromagnetically coupled with the radiating element 3. The housing 8 includes: the front surface 8a which a user is expected to squarely face; and the side surface 8c surrounding the front surface 8a, and at least a portion of each of the radiating element 3 and the parasitic element 6 is provided farther outward from the housing 8 than the side surface 8c in the front view of the housing 8 and on the back surface 8b side relative to the front surface 8a (that is, behind the front surface 8a) in the side view of the housing 8. Furthermore, the parasitic element 6 is provided closer to the front surface 8a than the radiating element 3 is.

With this, the antenna 1 has directivity to the front surface 8a side of the housing 8 of the television 10 (the electric device). In addition, since the radiating element 3 and the parasitic element 6 of the antenna 1 are provided outside the side surface 8c of the housing 8 of the television 10, the occurrence of spoiling the exterior design when viewed from the front surface 8a of the television 10 (the electric device) is reduced compared to the case where the radiating element 3 and the parasitic element 6 of the antenna 1 are provided on the front surface 8a of the housing 8, for example. Furthermore, since the housing 8 of the television 10 or an element inside the housing 8 usually includes a conductor, the electromagnetic waves radiated from the radiating element 3 will be reflected by the housing 8 if the antenna 1 does not include the parasitic element 6. Therefore, in the case where the antenna 1 does not include the parasitic element 6, the radiating element 3 needs to be provided on the front surface 8a side relative to the front surface 8a of the housing 8 in order to provide the antenna 1 with the directivity to the front surface 8a side of the housing 8. In this regard, the antenna 1 according to the present embodiment has directivity to the front surface 8a side of the housing 8 because the parasitic element 6 is provided closer to the front surface 8a of the housing 8 than the radiating element 3 is. Therefore, even when the housing 8 is formed of a conductor, the antenna 1 according to the present embodiment reduces the occurrence of spoiling the exterior design of the television 10 and has directivity to the front surface 8a side of the housing 8.

Furthermore, as a result of the antenna 1 having the directivity to the front surface 8a side of the housing 8, the directivity in the longitudinal direction (the Y-axis direction) of the television 10 which is orthogonal to the direction of the directivity to the front surface 8a side of the housing 8 is reduced. When the antenna 9 is spaced apart from the antenna 1 in the longitudinal direction of the television 10, the antenna 9 is provided on the television 10 in a direction with low directivity when viewed from the antenna 1. Therefore, in the case where the antenna 1 and the antenna 9 are devices that operate in the same frequency band, the isolation therebetween can be enhanced. For example, in the case where the antenna 1 is a device that supports the Bluetooth (registered trademark) standard and the antenna 9 is a device that supports the wireless LAN standard, the interference between the antenna 1 and the antenna 9 can be reduced, and even in a situation in which both the devices transmit signals, it is possible to obtain high receiving sensitivity from each of the devices. When the antenna 9 is provided on the back surface 8b of the housing 8 of the television 10, the antenna 9 is unnoticeable from the front of the television 10, and thus it is possible to reduce the impact which the antenna 9 has on the exterior design of the television 10.

In the antenna 1 according to the present embodiment, the parasitic element 6 is provided in the plane substantially perpendicular to the plane including the radiating element 3.

Thus, the antenna 1 can be provided on the housing 8 so that the radiating element 3 and the parasitic element 6 of the antenna 1 are on the back surface 8b and the side surface 8c, respectively, of the housing 8, for example. In this case, the antenna 1 has directivity to the front surface 8a side of the housing 8 because the parasitic element 6 is provided closer to the front surface 8a of the housing 8 than the radiating element 3 is.

In the antenna 1 according to the present embodiment, the length of the radiating element 3 is approximately $0.25\lambda$, and the length of the parasitic element 6 is approximately $0.5\lambda$.

The horizontal length of the television 10 used in the present embodiment is approximately $10\lambda$, which is relatively long, in the case where electromagnetic waves at 2.4 GHz are used. In a typical antenna configuration including a parasitic element, a 0.5λ dipole antenna is provided horizontally to the parasitic element horizontally provided. However, in the case where the housing 8 of the television 10 is formed of a conductor, the directivity becomes oriented opposite the housing 8 under the impact of the reflection on the housing 8, under the condition that the housing 8 formed of a horizontally long conductor is proximate.

Meanwhile, the radiating element 3 according to the present embodiment is a monopole antenna of approximately 0.25λ; the total length of the horizontal portion of the radiating element 3 that faces the housing 8 is approximately 0.25λ, which is relatively short. Therefore, it is possible to reduce the impact of the reflection on the housing 8.

In the antenna 1 according to the present embodiment, the radiating element 3 is formed on the circuit board 2, and at least a portion of the circuit board 2 is provided more inward of the housing 8 than the side surface 8c in the front view of the housing 8.

This causes at least a portion of the antenna 1 to be hidden on the back surface 8b side of the housing 8 when the television 10 is viewed from the front surface 8a side, and thus it is possible to further reduce the occurrence of the antenna 1 spoiling the exterior design of the television 10.

In the antenna 1 according to the present embodiment, at least a portion of the radiating element 3 and the parasitic element 6 may be provided farther outward from (vertically below) the housing 8 than the vertically lower side surface 8c (the bottom surface) of the housing 8 in the front view of the housing 8.

The television 10 which is one example of the electric device according to the present embodiment includes the antenna 1 as a first antenna including: the radiating element 3 that radiates electromagnetic waves when supplied with electrical power; and the parasitic element 6 formed of a conductor and provided (i) near the radiating element 3 so as to be electromagnetically coupled with the radiating element 3 and (ii) in the plane substantially perpendicular to the plane including the radiating element 3. In addition, the television 10 further includes the housing 8 having the front surface 8a which a user is expected to squarely face and the side surface 8c surrounding the front surface 8a. At least a portion of each of the radiating element 3 and the parasitic element 6 is provided farther outward from the housing 8 than the side surface 8c in the front view of the housing 8 and behind the front surface 8a in the side view of the housing 8, and the parasitic element 6 is provided closer to the front surface 8a than the radiating element 3 is.

With this, the television 10 produces the same advantageous effects as those produced by the above-described antenna 1 alone.

The television 10 which is one example of the electric device according to the present embodiment further includes the antenna 9 as a second antenna for use in communication that may interfere with the communication for which the antenna 1 is used. The antenna 1 and the antenna 9 are arranged at the greatest possible distance from each other in a direction substantially orthogonal to the line segment connecting the radiating element 3 and the parasitic element 6.

In this case, the antenna 9 is provided in a direction with low directivity when viewed from the antenna 1. Therefore, it is possible to enhance the isolation between the antenna 1 and the antenna 9 and thus, the internal mutual interference therebetween can be reduced.

Embodiment 2

Next, an antenna 1a according to Embodiment 2 will be described with reference to FIG. 6 to FIG. 11. The antenna 1a according to the present embodiment has a configuration that enables improvement of the antenna-to-antenna isolation and allows downsizing of the antenna compared to the antenna 1 according to Embodiment 1 described above.

[2-1. Configuration of Antenna]

First, the configuration of the antenna 1a according to the present embodiment will be described with reference to FIG. 6.

Figure 6:
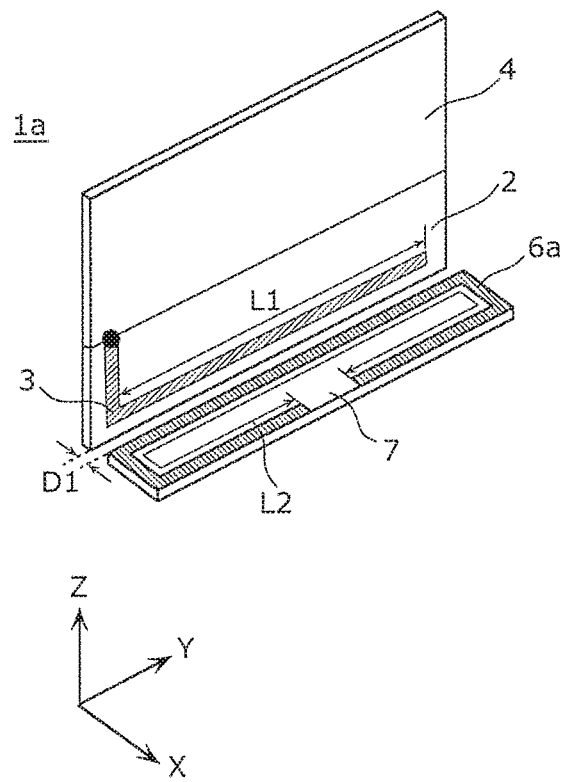
FIG. 6 is a perspective view illustrating the configuration of an antenna according to Embodiment 2.

FIG. 6 is a perspective view illustrating the configuration of the antenna 1a according to the present embodiment.

The configuration of the antenna 1a according to the present embodiment is the same as the configuration of the antenna 1 according to Embodiment 1 described above except that a parasitic element 6a has an approximate C-shape. Note that structural elements denoted by the same reference signs as the reference signs in FIG. 1 to FIG. 5 are the same as the structural elements described above, and detailed description thereof will be omitted.

As with the parasitic element 6 according to Embodiment 1 described above, the parasitic element 6a guides the electromagnetic waves radiated from the radiating element 3, without being supplied with electrical power. The parasitic element 6a is formed of, for example, metal foil such as copper foil on the dielectric substrate 7, has the total length L2 of approximately 0.5λ, and has an approximate C-shape (an approximate loop shape) with longitudinal end portions open. The parasitic element 6a having the approximate C-shape is provided in an orientation that positions end portions of the approximate C-shape at a greater distance than a center portion of the approximate C-shape from the radiating element 3. In the present embodiment, the parasitic element 6a is provided so that the longitudinal end portions (the open ends) of the parasitic element 6a are provided opposite the radiating element 3 across a longitudinal center portion of the parasitic element 6a that has a length of approximately 0.25λ and an approximate longitudinal center position in the parasitic element 6a is located close to the radiating element 3. In other words, the parasitic element 6a includes: a straight portion that is approximately 0.25λ long and extends in the Y-axis direction; orthogonal portions that are connected to both ends of the straight portion and extend in the positive direction on the X axis; and folded back portions that are connected to end portions of the orthogonal portions and provided parallel to the straight portion. By using the parasitic element 6a having the above shape, it is possible to downsize the antenna 1a in the Y-axis direction, and thus the antenna 1a can be made compact.

Next, the distribution of the electric current in the parasitic element 6a will be described with reference to FIG. 7.

Figure 7:
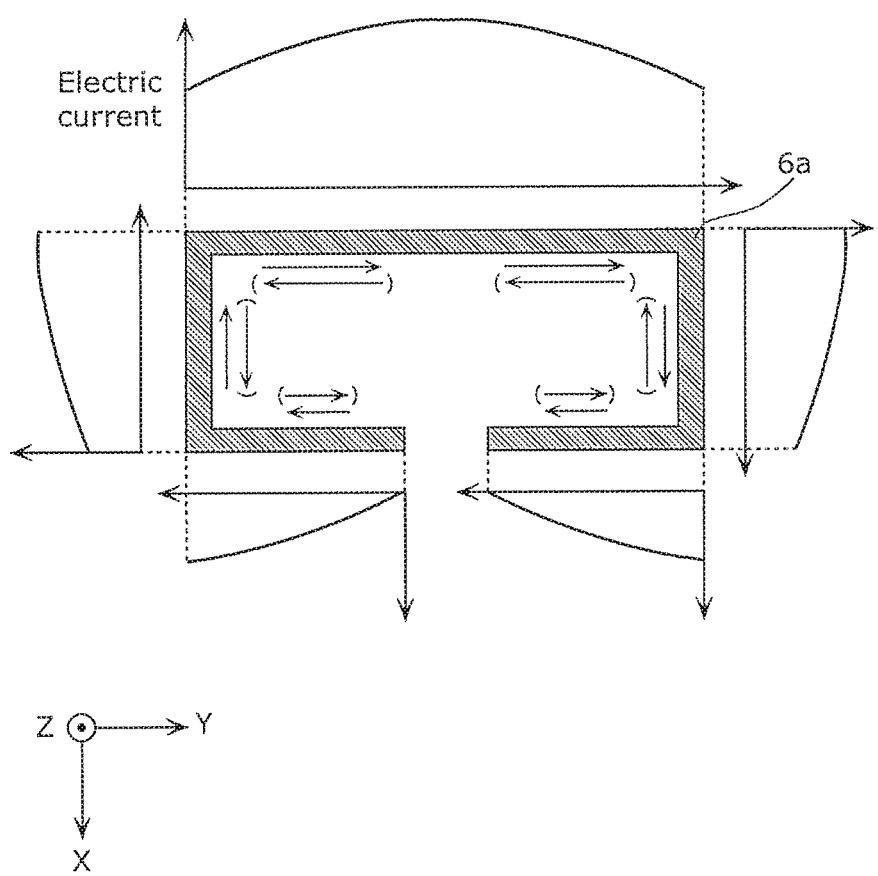
FIG. 7 schematically shows the distribution of the electric current that is excited in a parasitic element according to Embodiment 2.

FIG. 7 schematically shows the distribution of the electric current that is excited in the parasitic element 6a according to the present embodiment. In FIG. 7, the graphs show the amplitude of an electric current flowing through the respective longitudinal positions in the parasitic element 6a. In FIG. 7, the arrows illustrated near the parasitic element 6a indicate the orientations of the electric current. As illustrated in FIG. 7, since the total length L2 of the parasitic element 6a is approximately 0.5λ, the amplitude of an electric current is largest at the center position in the parasitic element 6a and lowest at the open ends of the parasitic element 6a. It is possible to strengthen the coupling between the radiating element 3 and the parasitic element 6a by bringing a position in the parasitic element 6a at which the amplitude of the electric current is largest, that is, a portion of the parasitic element 6a that is located approximately 0.25λ inward toward the center from the open ends thereof, close to the radiating element 3.

[2-2. Advantageous Effects, Etc.]

Described next are the advantageous effects produced when the antenna 1a according to the present embodiment, configured as described above, is secured to the television 10 as in Embodiment 1 described above, and measurement results for various characteristics.

When the parasitic element 6a is provided near the radiating element 3 so as to be electromagnetically coupled with the radiating element 3 and is provided closer to the front surface 8a of the housing 8 of the television 10 than the radiating element 3 is, the directivity of the antenna 1a to the front surface 8a side of the housing 8 can be increased. Furthermore, as a result of an increase in the directivity of the antenna 1a to the front surface 8a side of the housing 8, the directivity thereof in the longitudinal direction (the Y-axis direction) of the television 10 which is orthogonal to the direction of the directivity to the front surface 8a side of the housing 8 is reduced. In the case where the antenna 9 is provided on the television 10 at a distance from the antenna 1a in the longitudinal direction of the television 10, the antenna 9 is provided in a direction with low directivity when viewed from the antenna 1a, and thus it is possible to enhance the isolation between the antenna 1a and the antenna 9.

Furthermore, the isolation between the antenna 1a according to the present embodiment and the antenna 9 becomes higher than the isolation between the antenna 1 according to Embodiment 1 described above and the antenna 9 as a result of the following two advantageous effects.

Firstly, the longitudinal center portion of the parasitic element 6a is provided along the Y-axis direction, and both longitudinal end portions of the parasitic element 6a are bent in the X-axis direction, in FIG. 6 and FIG. 7. Thus, it is possible to increase the distance between the parasitic element 6a in which the antenna current is excited and the antenna 9 that is spaced apart from the parasitic element 6a in the Y-axis direction. When the distance is increased, the isolation between the antenna 1a and the antenna 9 is enhanced.

Secondly, when there is an element portion that extends in the X-axis direction, electromagnetic waves are radiated in the Y-axis direction, but, as illustrated in FIG. 7, the antenna currents in two, left and right portions extending in the positive direction on the X axis have the same amplitude and opposite phases. Therefore, the electromagnetic waves radiated from the two, left and right portions of the parasitic element 6a that extend in the positive direction on the X axis cancel out each other, meaning that the radiation from the parasitic element 6a in the Y-axis direction is kept at a low level.

As a result of these advantageous effects, the isolation between the antenna 1a and the antenna 9 can be higher than in Embodiment 1 described above.

Subsequently, the advantageous effects of improving the directivity and the isolation due to the parasitic element 6a being provided will be described below on the basis of the measurement results.

First, the measurement results for radiation patterns of the antenna 1a will be described with reference to FIG. 8A and FIG. 8B.

Figure 8A:
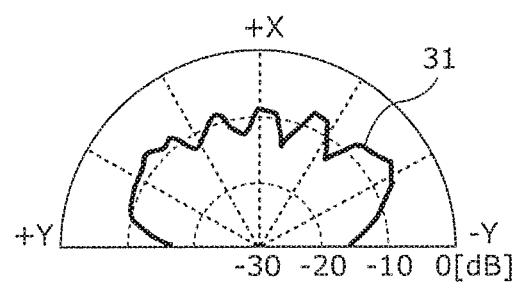
FIG. 8A is a radiation pattern indicating the directivity of horizontally polarized waves in the X-Y plane (the horizontal plane) from an antenna without a parasitic element.

FIG. 8A is a radiation pattern indicating the directivity of horizontally polarized waves in the XY plane (the horizontal plane) from the antenna 1a without the parasitic element 6a. The radiation pattern is indicated by a curve 31 in FIG. 8A.

Figure 8B:
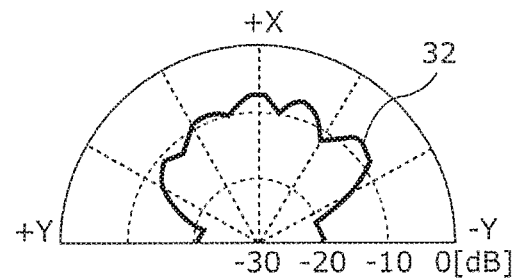
FIG. 8B is a radiation pattern indicating the directivity of horizontally polarized waves in the X-Y plane (the horizontal plane) from an antenna with a parasitic element.

FIG. 8B is a radiation pattern indicating the directivity of horizontally polarized waves in the XY plane (the horizontal plane) from the antenna 1a with the parasitic element 6a. The radiation pattern is indicated by a curve 32 in FIG. 8B.

Herein, the +X direction (the positive direction on the X axis) is defined as a direction on the front surface 8a side of the television 10, and the Y-axis direction is defined as the longitudinal direction of the housing 8 of the television 10.

As illustrated in FIG. 8A and FIG. 8B, when the parasitic element 6a is added, the gain on the front surface side of the television 10 improves by approximately 1 dB, and the gain in the Y-axis direction is reduced.

Next, the measurement results for the isolation characteristics of the antenna 1a and the antenna 9 will be described with reference to FIG. 9.

Figure 9:
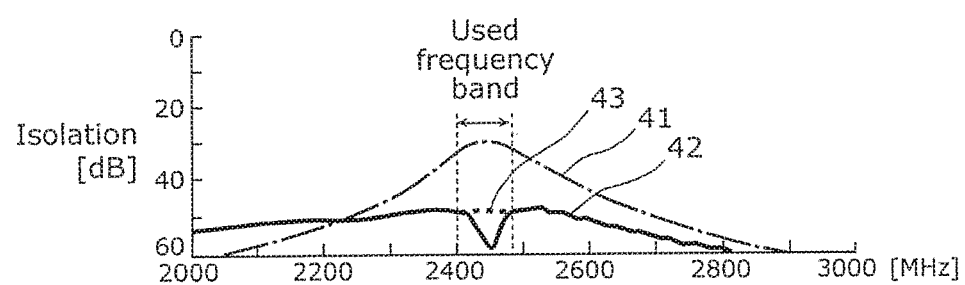
FIG. 9 is a graph illustrating the isolation characteristics of two antennas according to Embodiment 2.

FIG. 9 is a graph illustrating the isolation characteristics of the antenna 1a and the antenna 9. FIG. 9 shows the isolation characteristics of a device that supports the Bluetooth (registered trademark) standard as the antenna 1a and a device that supports the wireless LAN standard as the antenna 9. In FIG. 9, a dashed-dotted curve 41 indicates the isolation characteristics obtained when the parasitic element 6a (and the parasitic element 6) is not used, and a solid curve 42 indicates the isolation characteristics obtained when the parasitic element 6a is used. A dotted line 43 indicates the isolation characteristics obtained when the parasitic element 6 is used, that is, when the antenna 1 according to Embodiment 1 described above is used instead of the antenna 1a according to the present embodiment.

As illustrated in FIG. 9, the use of the parasitic element 6a improves the isolation by up to 30 dB in the used frequency band (of 2.40 GHz to 2.48 GHz).

The high isolation spot found in the curve 42 around 2,450 MHz is generated by providing the parasitic element 6a having an approximate C-shape such as that in the antenna 1a according to the present embodiment (compare the curve 42 and the curve 43 with each other).

Next, the setting range of the distance D1 between the parasitic element 6a and the radiating element 3 will be described with reference to FIG. 10.

Figure 10:
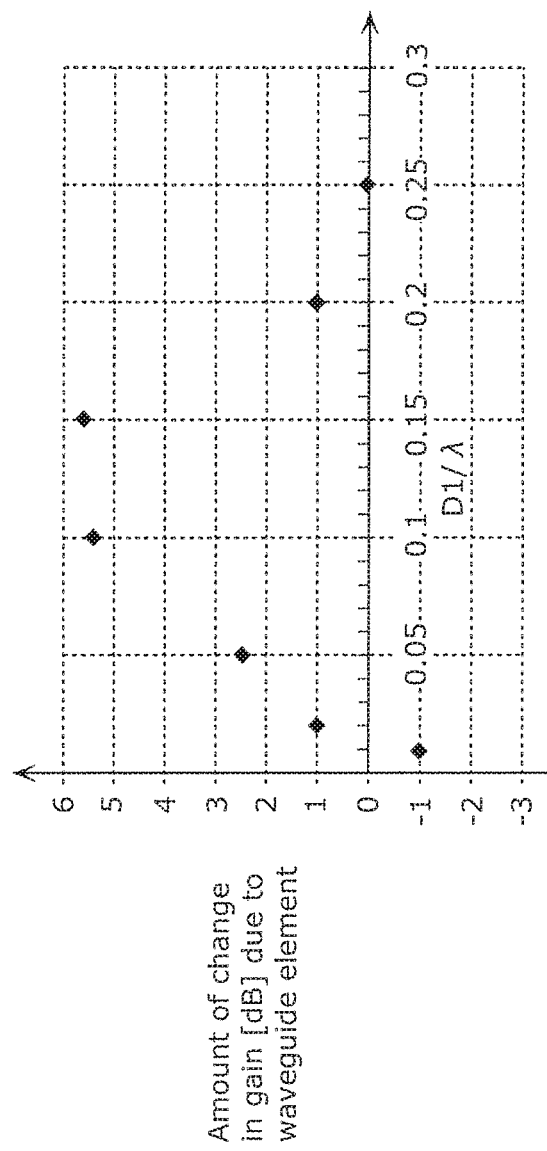
FIG. 10 is a graph illustrating the amount of change in gain of an antenna according to Embodiment 2 due to a parasitic element.

FIG. 10 is a graph illustrating the amount of change in gain of the antenna 1a according to the present embodiment due to the parasitic element 6a. FIG. 10 shows, using the distance D1 as a parameter, the amount of change in gain directed on the front surface 8a side of the housing 8 due to the parasitic element 6a being used in the antenna 1a. In other words, FIG. 10 shows a difference between the gain of the antenna 1a that does not include the parasitic element 6a and the gain of the antenna 1a that includes the parasitic element 6a. In FIG. 10, the horizontal axis represents the ratio of the distance D1 to the effective wavelength λ, and the vertical axis represents the amount of change in gain of the antenna that does not include the parasitic element 6a. In this example, the distance D3 between the parasitic element 6a and the housing 8 of the television 10 is 5 mm (0.04λ).

As illustrated in FIG. 10, when the distance D1 is less than 0.02λ or exceeds 0.25λ, the amount of change in gain is a negative value or zero, and thus the advantageous effects of improving the gain due to the parasitic element 6a are not obtained. This is considered to be due to the degree of coupling between the parasitic element 6a and the radiating element 3 being lowered and the antenna current being no longer distributed in the parasitic element 6a when the distance D1 between the parasitic element 6a and the radiating element 3 is too large. Furthermore, in order for the parasitic element 6a to operate as a director, the electric current that is excited in the parasitic element 6a needs to have a leading phase compared with the phase of the electric current flowing through the radiating element 3, but, when the parasitic element 6a and the radiating element 3 are close to each other, the difference in phase of the electric current between the parasitic element 6a and the radiating element 3 is reduced. For this reason, the parasitic element 6a is considered to fail to operate as a director.

From the foregoing, the distance D1 between the parasitic element 6a and the radiating element 3 is desirably in the range of approximately 0.02λ to approximately 0.25λ. Note that this preferable range of the distance D1 is a desirable range for when a parasitic element having a shape other than the approximate C-shape (for example, the parasitic element 6 according to Embodiment 1 described above) is used as well.

Next, the setting range of the distance D3 between the parasitic element 6a and the housing 8 of the television 10 will be described with reference to FIG. 11.

Figure 11:
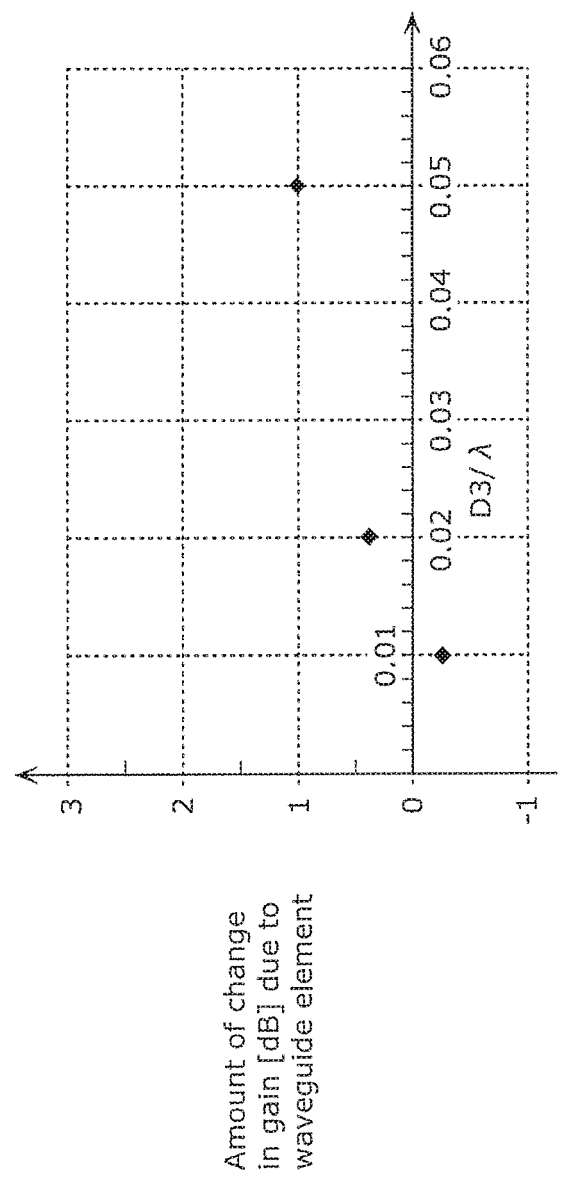
FIG. 11 is a graph illustrating the amount of change in gain of an antenna according to Embodiment 2 due to a parasitic element.

FIG. 11 is a graph illustrating the amount of change in gain of the antenna 1a according to the present embodiment due to the parasitic element 6a. FIG. 11 shows, using the distance D3 as a parameter, the amount of change in gain directed on the front surface 8a side of the housing 8 due to the parasitic element 6a being used in the antenna 1a. In other words, FIG. 11 shows a difference between the gain of the antenna 1a that does not include the parasitic element 6a and the gain of the antenna 1a that includes the parasitic element 6a. In FIG. 11, the horizontal axis represents the ratio of the distance D3 to the effective wavelength λ, and the vertical axis represents the amount of change in gain of the antenna that does not include the parasitic element 6a. In this example, the gain obtained when the housing 8 is formed of a conductor is measured. The distance D1 between the parasitic element 6a and the radiating element 3 is 2.5 mm (0.02λ).

As Illustrated in FIG. 11, when the distance D3 is less than 0.02λ, the amount of change in gain is a negative value, and thus the advantageous improvement effects produced by adding the parasitic element 6a are not obtained. This is presumed to be due to the electromagnetic waves re-radiated from the parasitic element 6a being reflected by the housing 8, resulting in the directivity in a direction different from the direction on the front surface side of the television 10, when the distance D3 between the parasitic element 6a and the housing 8 of the television 10 is short.

From the foregoing, the distance D3 between the parasitic element 6a and the housing 8 is desirably approximately 0.02λ or more. Note that this preferable range of the distance D3 is a desirable range for when a parasitic element having a shape other than the approximate C-shape (for example, the parasitic element 6 according to Embodiment 1 described above) is used as well.

The foregoing configuration and advantageous effects of the antenna 1a according to the present embodiment are summarized below.

In the antenna 1a according to the present embodiment, the parasitic element 6a has an approximate C-shape and is provided in an orientation that positions end portions of the approximate C-shape at a greater distance than a center portion of the approximate C-shape from the radiating element 3. Furthermore, the longitudinal end portions of the parasitic element 6a are provided closer to the front surface 8a of the housing 8 than the longitudinal center portion of the parasitic element 6a is.

With this, the size of the parasitic element 6a in the longitudinal direction is reduced, and thus the antenna 1a can be made compact. In addition, the directivity of the parasitic element 6a to the front surface 8a side of the housing 8 is further improved. Furthermore, in the case where another antenna 9 is provided at a distance in the longitudinal direction of the parasitic element 6a (in the present embodiment, the longitudinal direction of the television 10), the isolation between the antenna 1a and the antenna 9 is improved.

Furthermore, in the antenna 1a according to the present embodiment, the distance D1 between the parasitic element 6a and the radiating element 3 is in the range of approximately 0.02λ to approximately 0.25λ.

With this, the parasitic element 6a is electromagnetically coupled with the radiating element 3, and thus an antenna current having a leading phase compared with the phase in the radiating element 3 is distributed on the parasitic element 6a. Thus, the parasitic element 6a is capable of guiding the electromagnetic waves radiated from the radiating element 3. Furthermore, in the present embodiment, the parasitic element 6a is provided closer to the front surface 8a of the housing 8 than the radiating element 3 is, and thus the directivity to the front surface 8a side of the housing 8 is increased.

Furthermore, in the antenna 1a according to the present embodiment, the distance D1 between the radiating element 3 and the center portion of the parasitic element 6a that is located approximately 0.25λ inward toward the center from the both longitudinal end portions thereof is in the range of approximately 0.02λ to approximately 0.25λ.

With this, the position in the parasitic element 6a at which the amplitude of the electric current is largest (that is, a portion of the parasitic element 6a that is located approximately 0.25λ inward toward the center from the open ends thereof) is close to the radiating element 3, and thus it is possible to strengthen the coupling between the radiating element 3 and the parasitic element 6a.

Furthermore, in the antenna 1a according to the present embodiment, the distance D3 between the housing 8 and the parasitic element 6a is approximately 0.02λ or more.

With this, even when the housing 8 is formed of a conductor, it is possible to increase the directivity of the antenna 1a to the front surface 8a side of the housing 8.

Embodiment 3

Next, an antenna 1b according to Embodiment 3 will be described with reference to FIG. 12. The antenna 1b according to the present embodiment is different from the antennas according to the foregoing embodiments in the arrangement of the radiating element 3 and the like.

Figure 12:
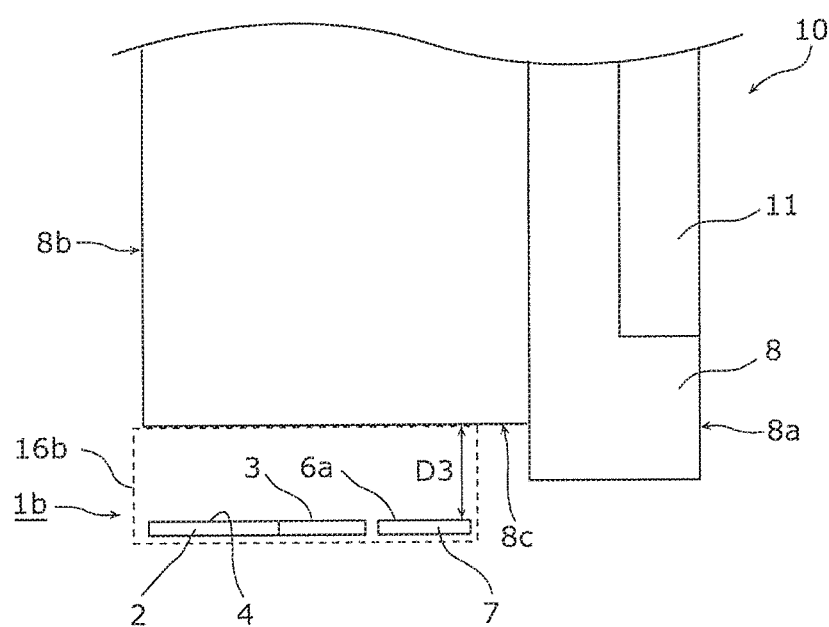
FIG. 12 is a side view illustrating a configuration in which an antenna according to Embodiment 3 is installed on the side surface (the bottom surface) of a housing of a television.

FIG. 12 is a side view illustrating a configuration in which the antenna 1b according to the present embodiment is installed on the side surface 8c (the bottom surface) of the housing 8 of the television 10. Note that in FIG. 12, structural elements denoted by the same reference signs as the reference signs in FIG. 1 to FIG. 11 are the same as the structural elements described above, and detailed description thereof will be omitted.

As illustrated in FIG. 12, the antenna 1b according to the present embodiment is housed in a case 16b and includes the circuit board 2, the radiating element 3, the ground pattern 4, the parasitic element 6a, and the dielectric substrate 7, as in the foregoing embodiments.

The case 16b is a container formed of an insulating member such as resin as with the case 16 according to Embodiment 1 described above, but has a shape different from the shape of the case 16. Note that in FIG. 12, only the contour of the case 16b is indicated by the dashed line for illustrating the arrangement of the elements of the antenna 1b.

The parasitic element 6a is the same as or similar to the parasitic element 6a according to Embodiment 2 described above.

The antenna 1b according to the present embodiment is different from those in the foregoing embodiments in that, as illustrated in FIG. 12, the circuit board 2 is provided parallel to the side surface 8c (the bottom surface) of the housing 8 of the television 10.

In the antenna 1b according to the present embodiment, the circuit board 2, the radiating element 3, and the parasitic element 6a are configured in substantially the same plane, and the parasitic element 6a is provided closer to the front surface 8a of the housing 8 of the television 10 than the radiating element 3 is.

Since the circuit board 2 is located at the side surface 8c (the bottom surface) of the housing 8 of the television 10, the antenna 1b according to the present embodiment has the advantage of not protruding on the back surface 8b side.

Furthermore, the positional relationship in which the parasitic element 6a is provided closer to the front surface 8a of the housing 8 than the radiating element 3 is remains the same as that in the foregoing embodiments, and thus the directivity to the front surface 8a side of the housing 8 can be increased.

Embodiment 4

Next, an antenna 1c according to Embodiment 4 will be described with reference to FIG. 13 to FIG. 15. The antenna 1c according to the present embodiment is different from the antennas according to the foregoing embodiments mainly in the configurations of the parasitic element and the case.

Figure 13:
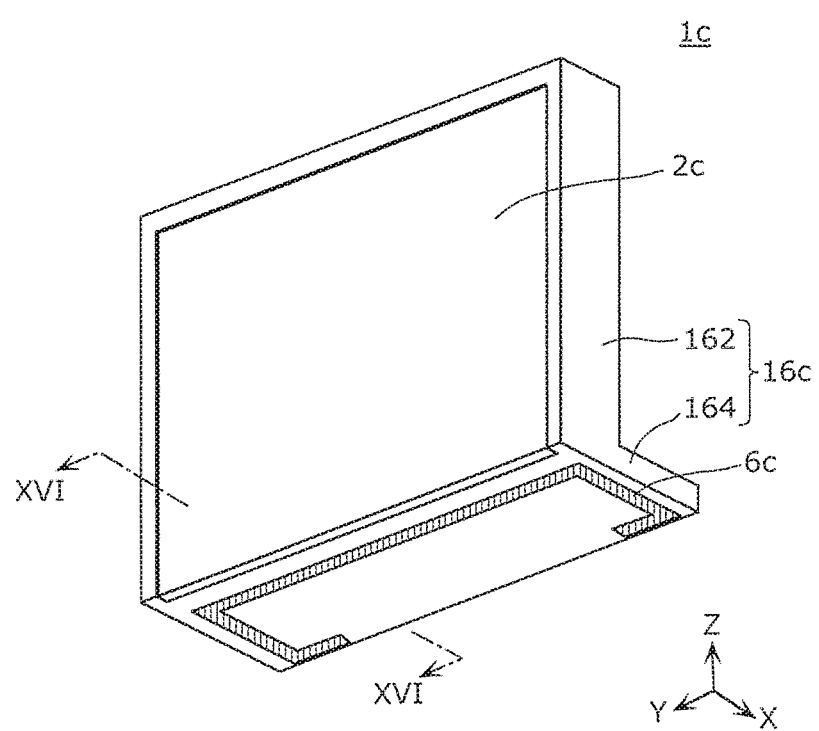
FIG. 13 is an exterior perspective view of an antenna according to Embodiment 4.

FIG. 13 is an exterior perspective view of the antenna 1c according to the present embodiment.

Figure 14:
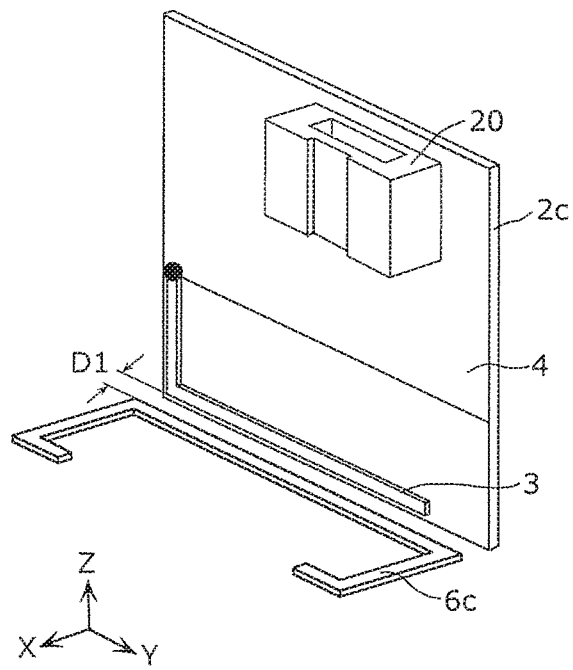
FIG. 14 is a perspective view illustrating a main portion of an antenna according to Embodiment 4.

FIG. 14 is a perspective view illustrating a main portion of the antenna 1c according to the present embodiment. In the perspective view in FIG. 14, the antenna 1c with a case 16c removed is depicted for illustrating the main portion of the antenna 1c.

Figure 15:
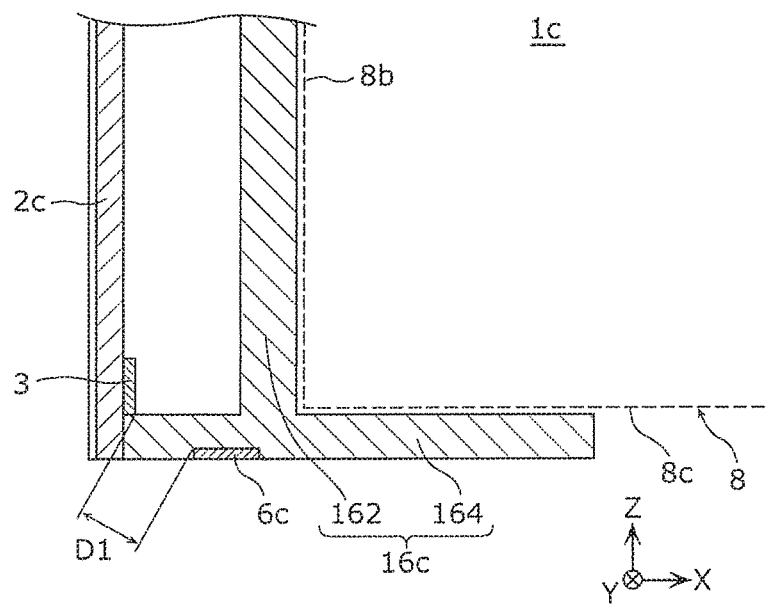
FIG. 15 is an enlarged cross-sectional view of a portion of an antenna according to Embodiment 4 In which a radiating element and a parasitic element are provided.

FIG. 15 is an enlarged cross-sectional view of a portion of the antenna 1c according to the present embodiment in which the radiating element 3 and a parasitic element 6c are provided. FIG. 15 illustrates a cross-section taken along line XVI-XVI in FIG. 13. In FIG. 15, the housing 8 to which the antenna 1c is secured is indicated by a dashed line.

Note that in the illustration in FIG. 14 and FIG. 15, the radiating element 3 is thicker than actually is for clarifying the position of the radiating element 3.

As illustrated in FIG. 13, the antenna 1c according to the present embodiment includes the case 16c, the parasitic element 6c, and a circuit board 2c. As illustrated in FIG. 14, the antenna 1c further includes the radiating element 3, the ground pattern 4, and a connector 20 provided on the circuit board 2c.

The case 16c is a support member that supports the circuit board 2c and the parasitic element 6c, and is formed of, for example, an insulating member such as resin. In the present embodiment, the case 16c includes: a board-shaped portion 164 formed integrally with the parasitic element 6c; and a box-shaped portion 162 provided at a position corresponding to three perimeter sides of the circuit board 2c, as illustrated in FIG. 13. The case 16c has a rectangular opening surrounded by the board-shaped portion 164 and the box-shaped portion 162, and the circuit board 2c is fitted into the rectangular opening.

The case 16c including the box-shaped portion 162 and the board-shaped portion 164 and the parasitic element 6c according to the present embodiment are formed integrally with each other. The case 16c is formed, for example, by insert molding. Specifically, molten resin is injected around the parasitic element 6c and solidified in a mold, and thus the parasitic element 6c and the case 16c are integrally formed at the same time as the case 16c is molded.

As with the parasitic elements according to the foregoing embodiments, the parasitic element 6c is an element which is electromagnetically coupled with the radiating element 3 and in which an antenna current is excited and which guides electromagnetic waves. The parasitic element 6c according to the present embodiment is formed of a board-shaped conductor having an approximate C-shape and is not metal foil formed on the dielectric substrate unlike the parasitic element 6 according to Embodiment 1. For example, the parasitic element 6c is formed of sheet metal, the examples of which include copper and various alloys, and is shaped by pressing the sheet metal. When the insert molding described above is performed using the parasitic element 6c formed of a board-shaped conductor as just described, the parasitic element 6c and the case 16c can be easily integrally formed.

The parasitic element 6c is provided at the distance (the closest distance) D1 from the radiating element 3, as illustrated in FIG. 14 and FIG. 15. As in Embodiment 1, it is sufficient that the distance D1 be in the range of approximately $0.02\lambda$ to approximately $0.25\lambda$.

The circuit board 2c is the same as or similar to the circuit board 2 according to Embodiment 1. The radiating element 3 and the ground pattern 4 are provided on the circuit board 2c as with the circuit board 2 according to Embodiment 1. Furthermore, the connector 20 is provided on the circuit board 2c according to the present embodiment. A plug of an electric device, for example, is connected to the connector 20. The circuit board 2c transmits signals to and receives signals from the electric device through the connector 20. Furthermore, the circuit board 2c may be supplied with electrical power from the electric device through the connector 20.

Although the method of fitting the circuit board 2c into the case 16c is not particularly limited, an adhesive material, for example, can be used to fit the circuit board 2c into the case 16c. Thus, the radiating element 3 provided on the circuit board 2c is supported by the case 16c and formed integrally with the parasitic element 6c. This makes it possible to stabilize the relative positions of the radiating element 3 and the parasitic element 6c.

Note that the circuit board 2c may be secured to the case 16c by what is called thermal riveting, that is, preparing a small hole in the circuit board 2c, providing on the case 16c a standing pin that fits into this hole, fitting the circuit board into the case, and holding the circuit board in place by deforming the head of the pin by heat. Regarding the method of fitting the circuit board 2c into the case 16c, the circuit board may be further covered from outside by a lid-like resin member and held in place.

The antenna 1c according to the present embodiment is secured to the housing 8 of a television or the like, for example, as illustrated in FIG. 15. In the antenna 1c according to the present embodiment, the parasitic element 6c can be provided on the bottom surface (the surface in the negative side of the Z-axis) of the board-shaped portion 164 of the case 16c. In other words, the parasitic element 6c can be provided on the surface of the board-shaped portion 164 that is farthest from the side surface (the bottom surface) 8c of the housing 8. Thus, even when the board-shaped portion 164 is brought into contact with the side surface 8c of the housing 8 which is made of metal, the parasitic element 6c does not come into direct contact with the side surface 8c of the housing 8.

Next, the advantageous effects of the antenna 1c according to the present embodiment are described in comparison with the antenna 1 according to Embodiment 1. In the case where the parasitic element 6 is provided on the housing 8-side main surface of the dielectric substrate 7 as in the antenna 1 according to Embodiment 1, it is necessary to provide a predetermined distance for separation as illustrated in FIG. 4 in order to keep the parasitic element 6 from contacting the housing 8 and to exhibit the antenna performance. For this reason, the dielectric substrate 7 needs to be provided at a sufficient distance from the housing 8 so as not to contact the housing 8. In contrast, when the antenna 1c according to the present embodiment is secured to the housing 8, the board-shaped portion 164 can be brought into contact with the side surface 8c of the housing 8. Furthermore, it is possible to reduce the height of a portion of the antenna 1c that protrudes from the side surface 8c (that is, the length, in the Z-axis direction, of the portion protruding from the side surface 8c) while keeping the distance for separation from the housing 8 at substantially the same value. Therefore, the antenna 1c can be secured in a manner that makes it unnoticeable from the front surface of the housing 8. In addition, according to the present embodiment, the parasitic element 6c and the case 16c can be easily integrally formed by a method such as insert molding. Note that the parasitic element 6c and the case 16c may be integrally formed by a method other than insert molding. For example, the board-shaped parasitic element 6c with a small hole is prepared and a standing pin that fits into this hole may be provided on the case 16c so that the parasitic element 6c is secured to the case 16c by a thermal riveting method.

Other Embodiments

Embodiments 1 to 4 have each been described above by way of example of techniques disclosed in the present application. The techniques according to the present disclosure, however, are not limited to the foregoing embodiments, and can also be applied to embodiments obtained by carrying out modification, substitution, addition, omission, etc., as necessary. Furthermore, a new embodiment can be formed by combining the respective structural elements described in Embodiments 1 to 4 described above.

Figure 16A:
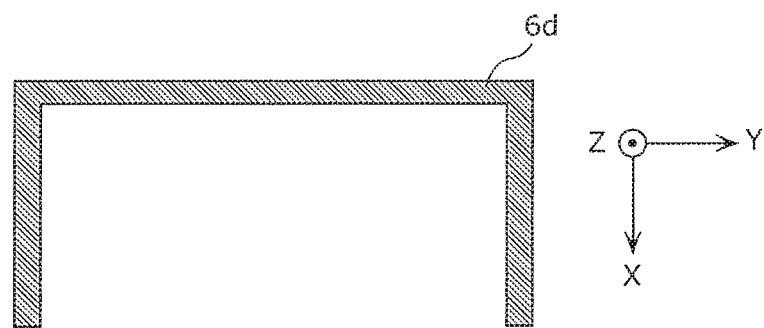
FIG. 16A illustrates the general shape of an approximate-C-shaped parasitic element.
Figure 16B:
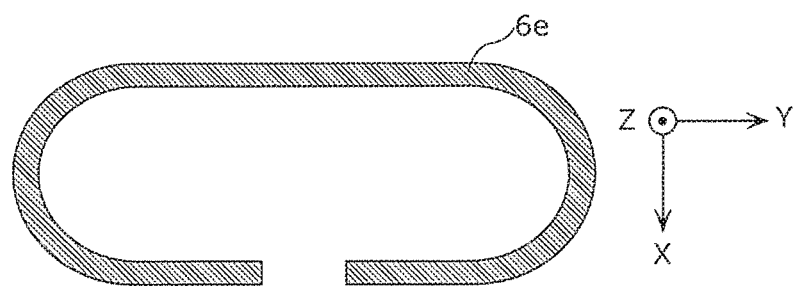
FIG. 16B illustrates the general shape of an approximate-C-shaped parasitic element.

For example, in the foregoing embodiments, a linear shape and an approximate C-shape are exemplified as the shape of the parasitic element, but the parasitic element may have a meandering shape or a linear shape with a meandering part as long as the total length L2 thereof is approximately 0.5λ. Furthermore, the shape illustrated in FIG. 7, etc., is exemplified as the approximate C-shape, but the approximate C-shape is not limited to this example. For example, shapes such as those illustrated in FIG. 16A and FIG. 16B may be applicable. FIG. 16A and FIG. 16B illustrate the general shape of an approximate-C-shaped parasitic element 6d and the general shape of an approximate-C-shaped parasitic element 6e, respectively. Note that the total length L2 of each of the parasitic element 6d illustrated in FIG. 16A and the parasitic element 6e illustrated in FIG. 16B is approximately 0.5λ. The parasitic element 6d illustrated in FIG. 16A is different from the example illustrated in FIG. 7, etc., in that the folded back portions parallel to the longitudinal center portion are not provided on the both longitudinal end portions. The parasitic element 6e illustrated in FIG. 16B is different from the example illustrated in FIG. 7, etc., in that the parasitic element 6e is bent with a predetermined curvature near the both longitudinal end portions. Even when the parasitic elements having the shapes illustrated in FIG. 16A and FIG. 16B are used, it is possible to produce the same advantageous effects as those produced in Embodiment 2 described above.

The radiating element 3 may have the shape of a board-shaped monopole antenna, an inverted-F antenna, or the like as long as it operates as an approximate-0.25-λ-long radiating element.

Furthermore, in Embodiments 1 to 3, the parasitic element is produced using copper foil on the dielectric substrate 7, but painting or metal vapor deposition may be used to produce the parasitic element, and the parasitic element may be produced using sheet metal. The parasitic element may be produced on the case 16 or 16b by painting or metal vapor deposition. Furthermore, although sheet metal is used to produce the parasitic element in Embodiment 4, metal foil such as copper foil may be used. In Embodiment 4, the parasitic element may be produced by panting or metal vapor deposition.

Furthermore, in the foregoing embodiments, the television 10 is exemplified as the electric device to which the antenna is secured, but the electric device is not limited to this example, and other electric devices such as air conditioners and microwave ovens may be used as long as such electric devices include a housing having a front surface and a back surface.

As the above, the embodiments have been described by way of example of techniques according to the present disclosure. To this extent, the accompanying drawings and the detailed description are provided.

Therefore, the structural elements set forth in the accompanying drawings and the detailed description may include not only structural elements essential to solve the problems but also structural elements not necessarily essential to solve the problems for the purpose of illustrating the above techniques. Thus, those inessential structural elements should not be deemed essential due to the mere fact that they are described in the accompanying drawings and the detailed description.

Furthermore, since the foregoing embodiments are for exemplifying the techniques according to the present disclosure, various changes, substitutions, additions, omissions, and so on, can be carried out within the scope of the Claims or its equivalents.

INDUSTRIAL APPLICABILITY

The present disclosure is applicable to an electric device that includes a housing and communicates with a wireless terminal on the front surface side of the housing. Specifically, the present disclosure is applicable to a television, a personal computer display, a microwave oven, an air conditioner, or the like.

The invention claimed is:

1. An antenna comprising:
   a radiating element that is formed of a conductor and radiates electromagnetic waves when supplied with electrical power; and
   a parasitic element that is formed of a conductor and provided near the radiating element so as to be electromagnetically coupled with the radiating element, the parasitic element being provided in a single plane substantially perpendicular to a plane including the radiating element,
   wherein the parasitic element has an approximate C-shape when viewed above the single plane and is provided in an orientation that positions end portions of the approximate C-shape at a greater distance than a center portion of the approximate C-shape from the radiating element.

2. The antenna according to claim 1, wherein the radiating element has an approximate L-shape.

3. The antenna according to claim 1, further comprising:
   a circuit board on which the radiating element and a ground pattern are formed,
   wherein the ground pattern is formed in the plane including the radiating element.

4. The antenna according to claim 3,
   wherein the parasitic element and a support member that supports the circuit board are integrally formed, and
   the radiating element is supported by the support member and formed integrally with the parasitic element.

5. The antenna according to claim 1, wherein the parasitic element is formed of a board-shaped conductor.

6. The antenna according to claim 1, wherein the parasitic element is a conductive pattern formed on a dielectric substrate.

7. The antenna according to claim 1,
   wherein when an effective wavelength of the electromagnetic waves is represented by lambda ($\lambda$),
   the radiating element has a length of approximately $0.25\lambda$, and
   the parasitic element has a length of approximately $0.5\lambda$.

8. The antenna according to claim 1,
   wherein when an effective wavelength of the electromagnetic waves is represented by lambda ($\lambda$),
   a distance between the radiating element and a center portion of the parasitic element is in the range of approximately $0.02\lambda$ to approximately $0.25\lambda$.

9. The antenna according to claim 1,
   wherein the antenna is secured to an electric device including a housing having a front surface which a user is expected to squarely face and a side surface surrounding the front surface,
   at least a portion of each of the radiating element and the parasitic element is provided farther outward from the housing than the side surface in a front view of the housing and behind the front surface in a side view of the housing, and
   the parasitic element is provided closer to the front surface than the radiating element is.

10. The antenna according to claim 9,
    wherein when an effective wavelength of the electromagnetic waves is represented by lambda ($\lambda$),
    a distance between the housing and the parasitic element is approximately $0.02\lambda$ or more.

11. An electric device, comprising:
    a first antenna including a radiating element that is formed of a conductor and radiates electromagnetic waves when supplied with electrical power, and a parasitic element that is formed of a conductor and provided near the radiating element so as to be electromagnetically coupled with the radiating element, the parasitic element being provided in a single plane substantially perpendicular to a plane including the radiating element; and
    a housing having a front surface which a user is expected to squarely face and a side surface surrounding the front surface,
    wherein at least a portion of each of the radiating element and the parasitic element is provided farther outward from the housing than the side surface in a front view of the housing and behind the front surface in a side view of the housing,
    the parasitic element is provided closer to the front surface than the radiating element is, and
    wherein the parasitic element has an approximate C-shape when viewed above the single plane and is provided in an orientation that positions end portions of the approximate C-shape at a greater distance than a center portion of the approximate C-shape from the radiating element.

12. The electric device according to claim 11, further comprising
    a second antenna for use in communication that may interfere with communication for which the first antenna is used,
    wherein the first antenna and the second antenna are spaced apart from each other in a direction substantially orthogonal to a line segment connecting the radiating element and the parasitic element.

* * * * *